April 19, 1966  J. F. VAUGHEN  3,246,403
HELICOPTER FLIGHT TRAINER
Filed Oct. 7, 1964  6 Sheets-Sheet 1
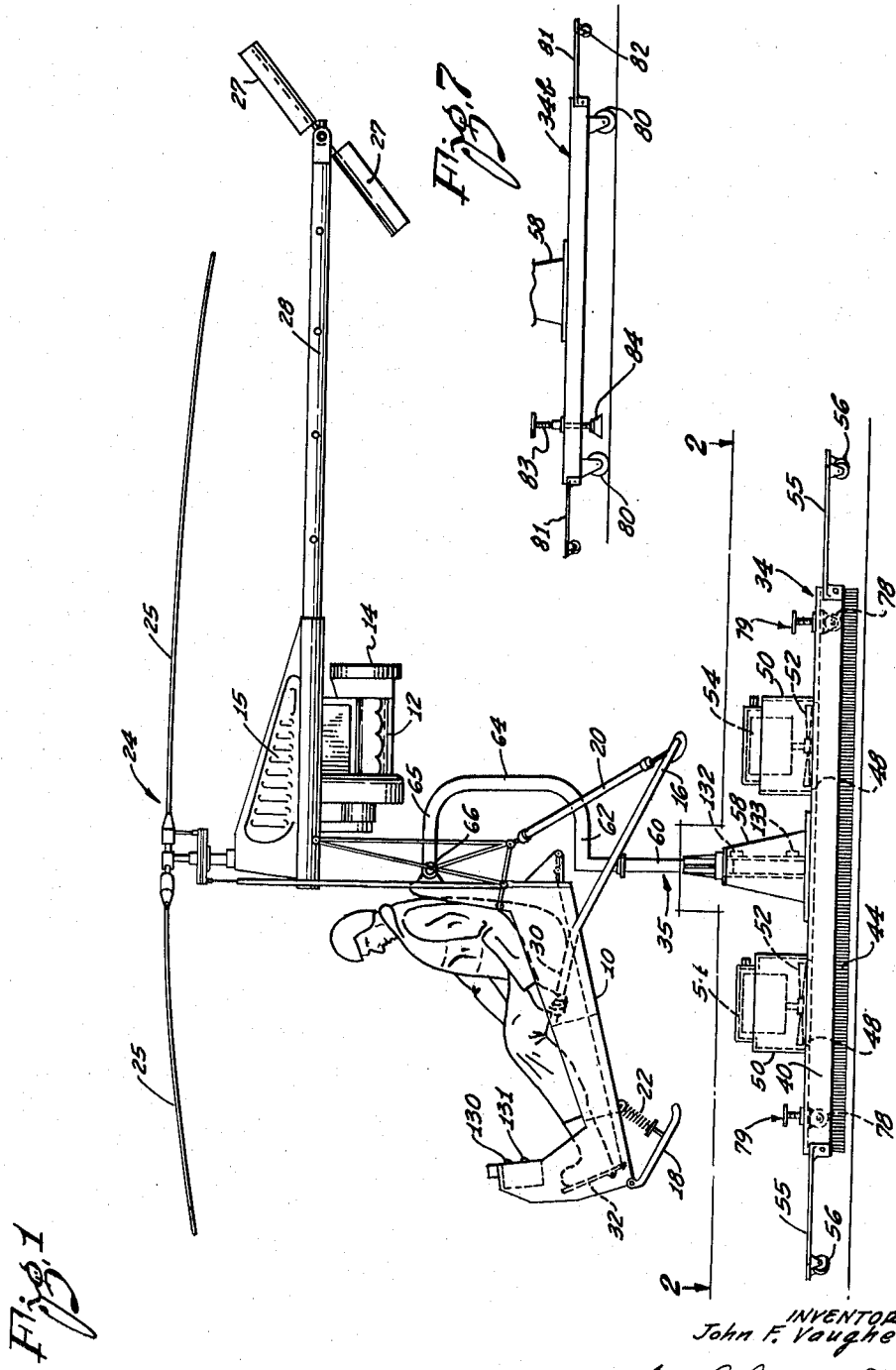
INVENTOR:
John F. Vaughen
By Smyth, Roston & Pavitt
Attorneys

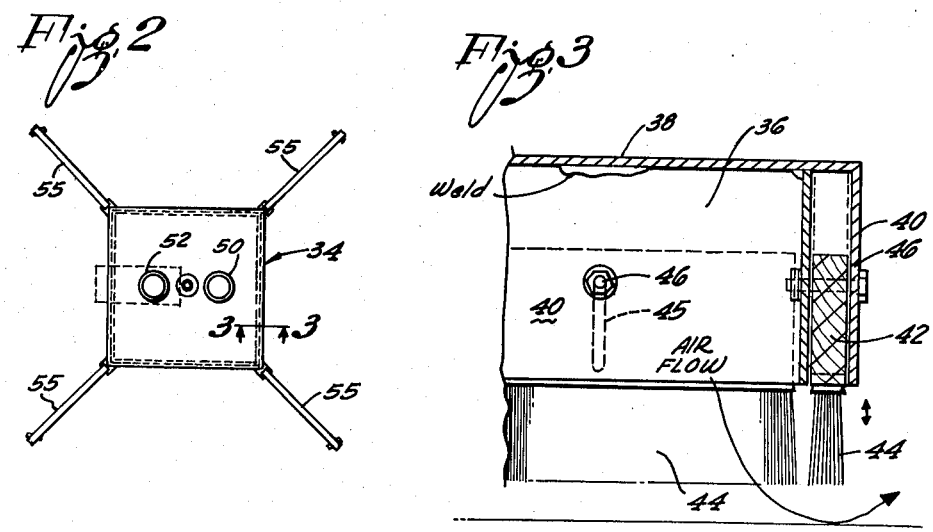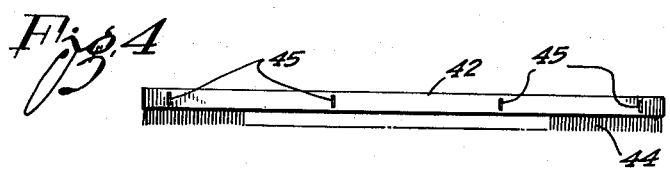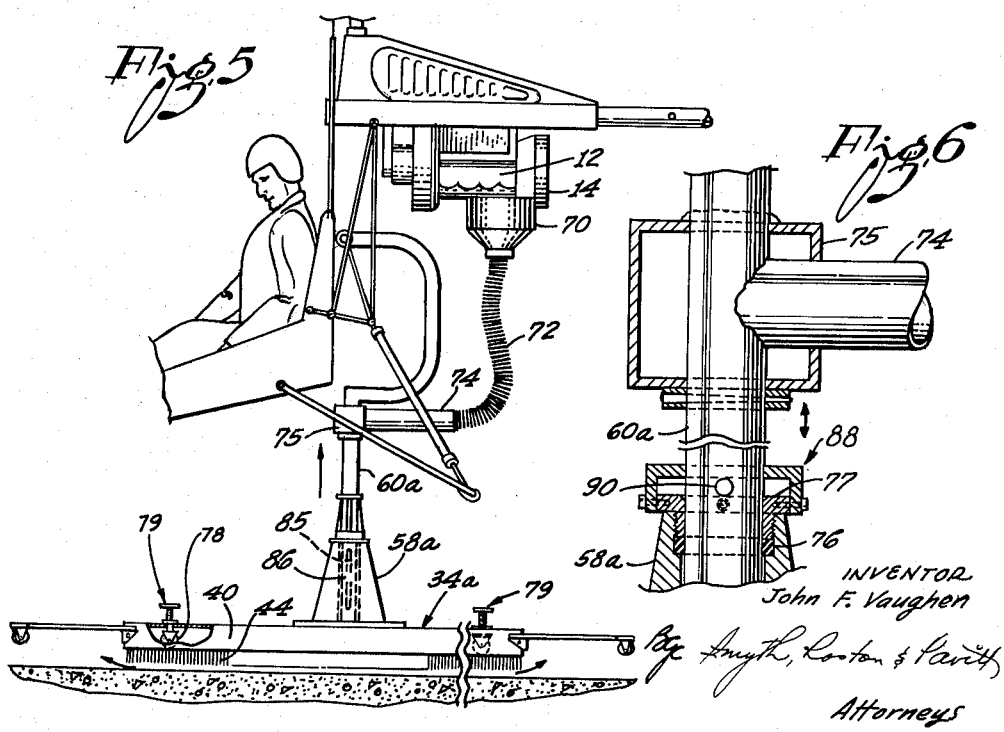

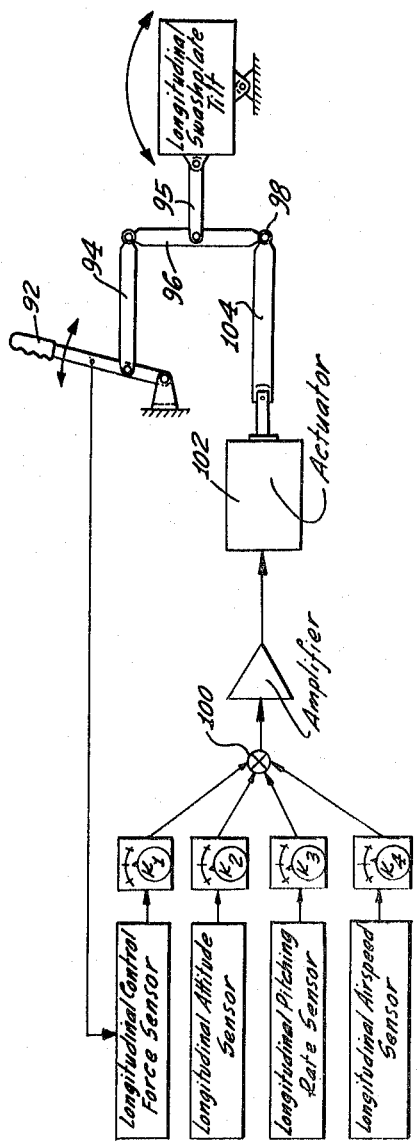
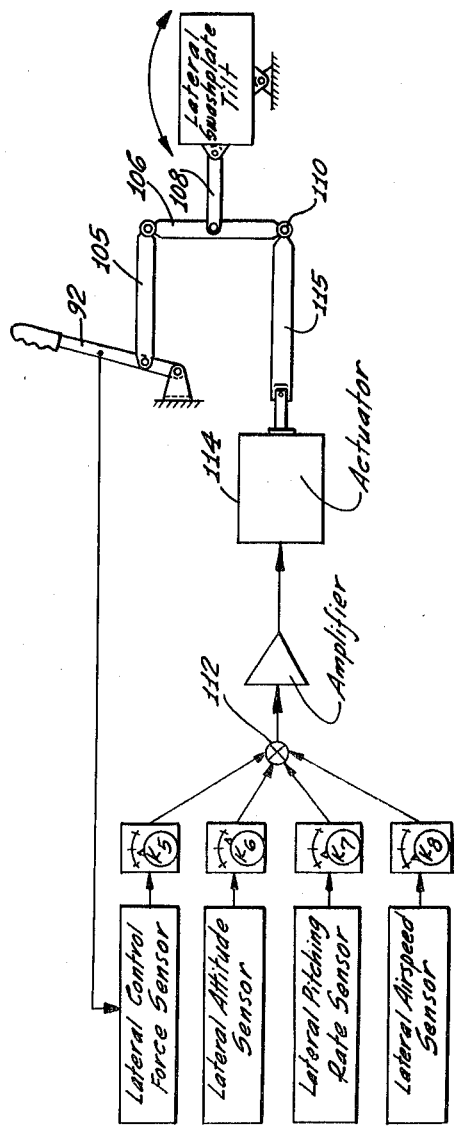
Fig. 8
Fig. 9
INVENTOR:
John F. Vaughen

April 19, 1966  J. F. VAUGHEN  3,246,403
HELICOPTER FLIGHT TRAINER
Filed Oct. 7, 1964  6 Sheets-Sheet 4
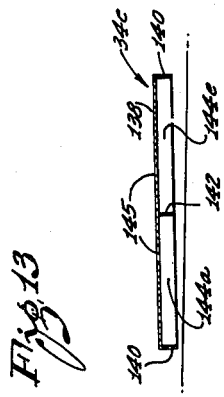
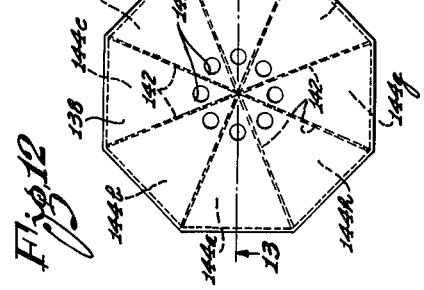
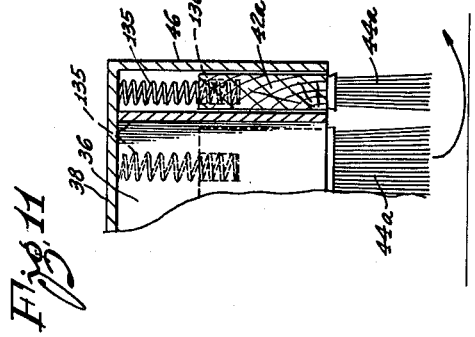
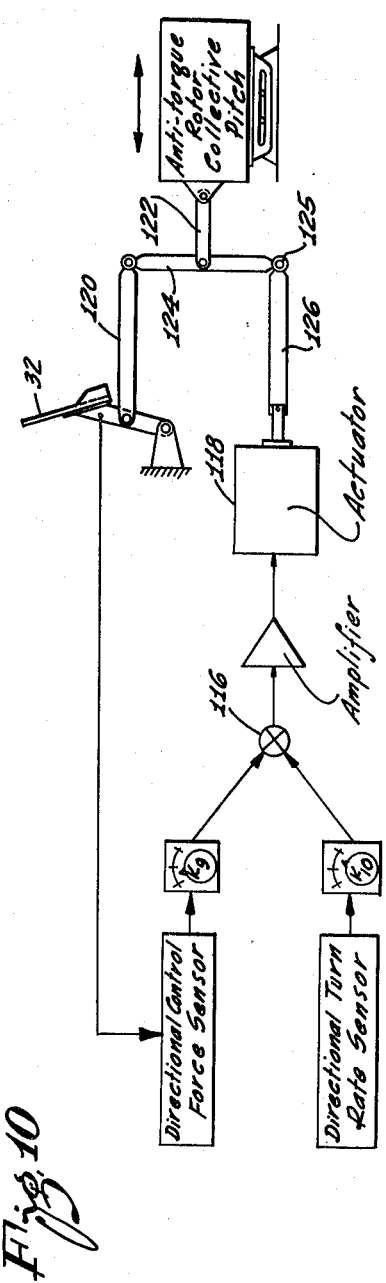
INVENTOR:
John F. Vaughen
By Smyth, Roston & Pavitt
Attorneys

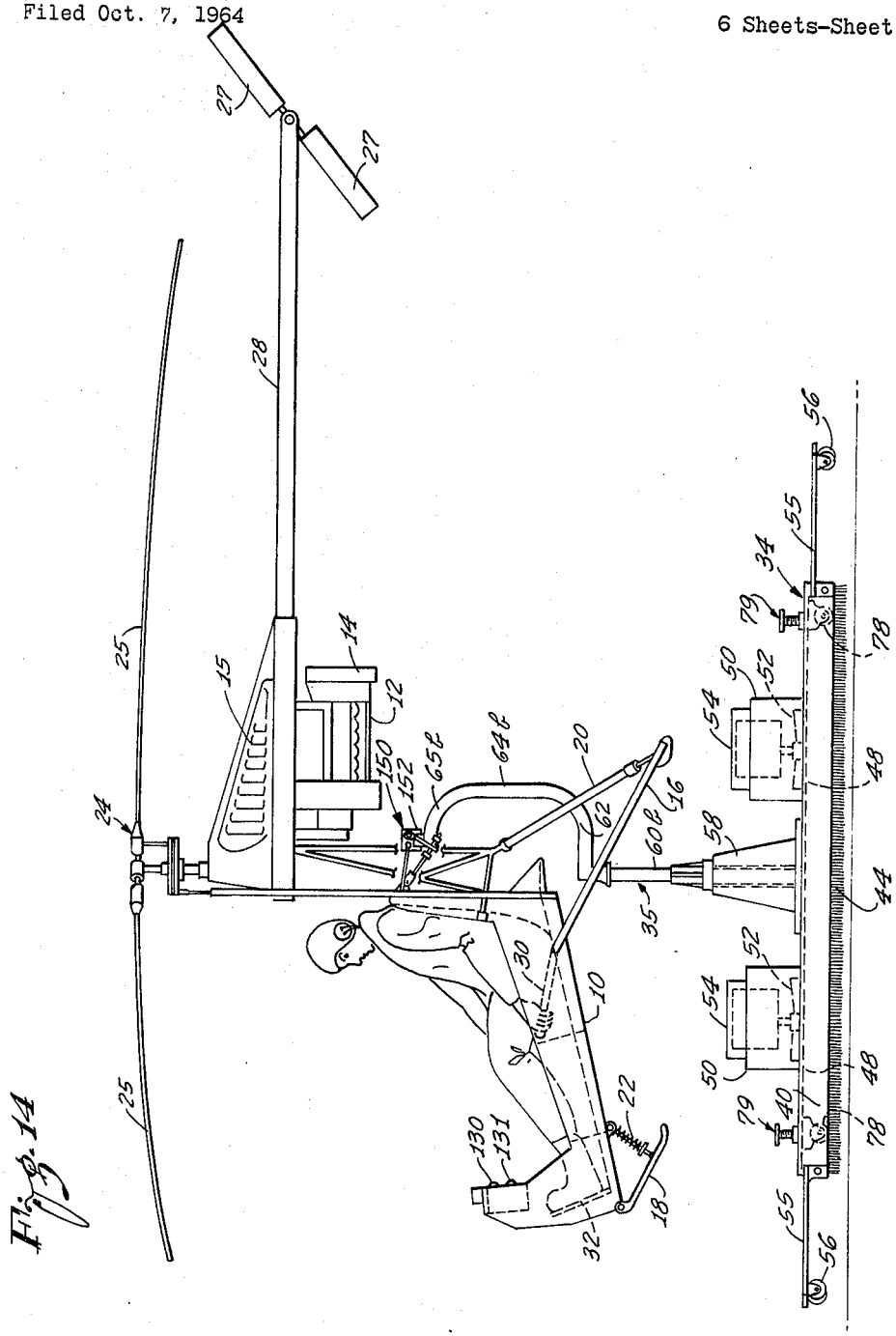

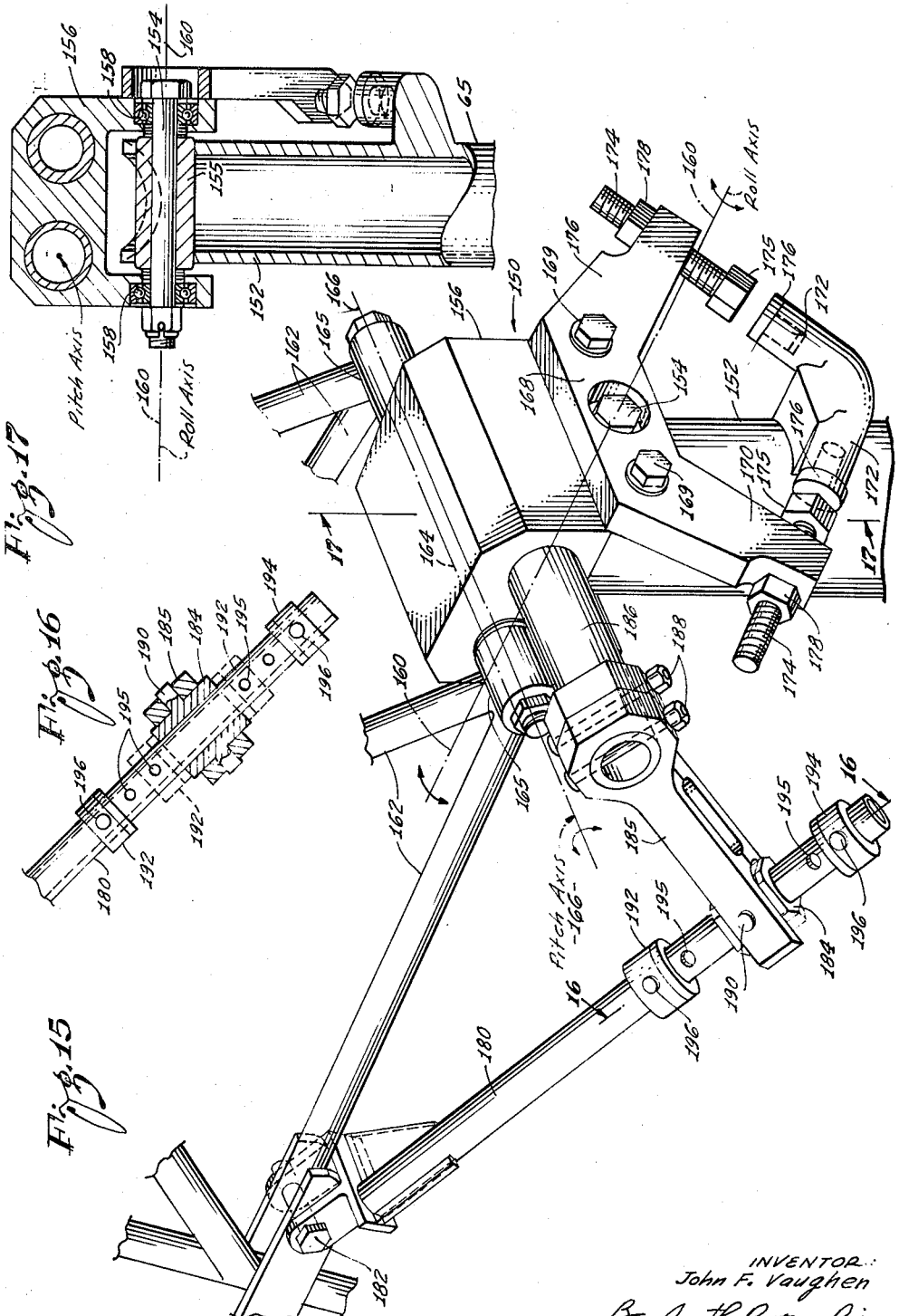

3,246,403
HELICOPTER FLIGHT TRAINER
John F. Vaughen, Palos Verdes, Calif., assignor to Del Mar Engineering Laboratories, Los Angeles, Calif., a corporation of California
Filed Oct. 7, 1964, Ser. No. 406,208
7 Claims. (Cl. 35—12)

This invention relates to an apparatus for training a student pilot to fly a hovering type aircraft, and is a continuation-in-part of my co-pending application of the same title, Serial No. 89,697, filed February 16, 1961, now Patent No. 3,164,991. While the invention is applicable to flight training for any type of hovering aircraft, it has special utility for training helicopter pilots. The description herein of a helicopter trainer will provide adequate guidance for those skilled in the art who may have occasion to apply the same principles for training pilots for other types of flight vehicles.

The flight controls of a helicopter are necessarily complex to allow full exploitation of its capability to move in all directions. The primary control of cyclic pitch of the main rotor blades employs a control stick which, in general, directs the aircraft in the direction of the shift of the stick and controls the attitude of the helicopter in space. The vertical direction of movement of the helicopter is controlled by the collective pitch of the main rotor blades; the aircraft rising if the collective pitch stick is lifted and vice versa. The yaw or angular direction of the fuselage is controlled by rudder pedals similar to those employed by fixed-wing aircraft. In the conventional helicopter these pedals control the collective pitch of the anti-torque rotor blades.

Because of the varying power requirements of a helicopter and its sensitivity to direction of movement, the throttle on the engine is constantly monitored. If the collective pitch is lifted the throttle setting must be simultaneously increased by the pilot and vice versa.

The basic flight characteristics of a helicopter result in the interaction of feed-back effects among the various controls. For example, a forward shift of the cyclic pitch control stick, resulting in higher forward velocity, increases the rotor lift and requires decrease in the collective pitch to maintain the same altitude. The decrease in collective pitch, in turn, results in a lower power requirement and requires a slight reduction in the throttle. Because the throttle reduction decreases the torque effect of the main rotor a corresponding adjustment of pedal pressure is required to maintain the given direction.

As a result of this complex interrelationship of the flight controls of a helicopter, a great deal of skill and dexterity is required on the part of the pilot and he is subject to a higher degree of tension and fatigue than the pilot of a fixed-wing aircraft. The situation is made more difficult by the fact that a trainer helicopter is necessarily a relatively small helicopter and the above mentioned feed-back effects among the various controls is especially pronounced in the smaller, more agile helicopters. It may be readily appreciated why normal flight training for a helicopter pilot requires approximately twice as much time as the normal flight training of a fixed-wing pilot.

A basic problem to which this invention is directed is to provide actual flight control practice with a helicopter with perfect safety for the student pilot. For this purpose the airborne flight must be close to ground level and there must be some safeguard to keep the aircraft from overturning with fatal results if the student pilot makes an error in control.

One prior art training procedure is to tether a helicopter to limit the rise of the helicopter from ground level. A serious disadvantage of such an arrangement, however, is that it affords no freedom for horizontal travel or forward flight of the helicopter. If a number of men, say three men, hold the tethers some horizontal travel of the helicopter is permitted but only at a slow rate. Greater freedom for horizontal travel may be provided by tethering the helicopter to a mobile wheeled carriage. However, any tethered arrangement restricts the motion of a helicopter so greatly that it is impossible for a student pilot to develop a true feeling of its highly sensitive control characteristics.

Another prior art training practice is to mount a helicopter on an inflated float that is provided with outriggers to keep the float from turning over. This arrangement provides mobility for only very low speed horizontal travel of the aircraft. If the helicopter is fixedly attached to the float, however, and the float stays on the water for safety, the trainee is not given practice in actual airborne flight. Also, training sites are limited to water surfaces only.

The present invention meets the general problem by providing an aircraft assembly of the helicopter type and by pivotally connecting the aircraft to a mobile base or base structure. The pivotal connection also has freedom for a limited range of vertical movement relative to the mobile base to permit unrestricted airborne flight of the aircraft within that arnge. In the initial embodiment of the invention, the aircraft has all of the essential parts of a helicopter including a seat for the student pilot, powered means for flight, and the usual flight controls for manipulation by the pilot. The base is highly mobile, being readily movable in any direction horizontally in response to aerodynamic thrust exerted by the aircraft to provide ample opportunity for flight travel of the aircraft. The mobile base is highly stable to resist tilting moments applied at the pivotal connection by the aerodynnamic forces. Any excessive tilt of the aircraft assembly is met by impact of the aircraft assembly against the mobile base or stop structure associated therewith and the mobile base is more than stable enough to withstand such impact forces. Thus the invention eliminates the possibility of the aircraft overturning.

The stable base may be of any suitable type. For example, the base may be a float or a wheeled carriage. A feature of the preferred practice of the invention, however, is the use in the base of an air-cushion vehicle that is supported close to the ground surface or close to a water surface on a cushion of air without actual contact with the surface. This air cushion vehicle may be of any conventional type including, but not limited to, plenum chamber, momentum curtain, annular jet, and labyrinth. Such a base structure offers practically no frictional resistance to horizontal movement, so horizontal speeds up to 30 or 40 miles per hour are feasible with this trainer. This allows the pilot to fly into the speed range which gives an additional lift, called "translational lift." Flying through this range changes the torque. The pilot must learn to allow for torque changes with the rudder pedals, whether increasing or decreasing air speed into or out of the translational lift range. No other method of tethered flight would allow training in this translational lift regime.

The aircraft is connected to the mobile base by universal joint means that permits the aircraft to rotate about a vertical axis relative to the base and at the same time permits the aircraft to tilt in all lateral directions relative to the base. In the initial practice of the invention, the center of gravity of the loaded aircraft combined with the weight of the pilot is on or close to the vertical axis of rotation and is at or close to the tilt pivot center so that the connection with the base structure does not interfere with pilot induced changes of the aircraft in pitch altitude or changes in roll attitude or changes in heading.

Ample freedom for angular movement of the aircraft relative to the base together with the freedom for change in level of the aircraft relative to the base through a given range of levels, permits unrestrained airborne flight of the aircraft within this range of levels. The range of levels must be limited to keep the aerodynamic thrust of the aircraft assembly from applying an excessive tilting moment to the base structure. It is not difficult to provide a range of levels on the order of 20 inches and such a range is ample for flight training.

Some safeguard is necessary to keep the aircraft from lifting the base structure into the air. For this purpose the power plant on the aircraft may provide adequate lift to support the aircraft within the given range of levels but not enough lift to carry the added weight of the base structure. If there is reason to use an aircraft that is capable of lifting the base structure, the safeguard may comprise a physical limit on upward collective pitch travel limiting maximum lift to a value which is insufficient to lift the base structure. Alternatively a throttle stop may be used to limit engine power to a value which is insufficient to lift the aircraft plus the mobile base.

A feature of the invention is the addition of an electro-mechanical variable stability system to the flight control. This is accomplished by installing modified Automatic Stabilization Equipment (ASE). The conventional ASE commands roll, pitch, and yaw attitude rates proportional to the pilot's control force, and when this control force is reduced to zero the ASE seeks to maintain the instant attitude of the helicopter. For the purpose of training a pilot, however, this ASE is modified in my invention to permit variation in the degree to which stabilization control is exercised. Any degree less than full stabilization leaves a margin of control to be exercised by the student pilot and rapid training is accomplished by progressively increasing this margin until the student pilot assumes the full burden of stabilization control.

A further feature of the invention is the concept of modifying the ASE to cause the training apparatus to simulate flight characteristics that are not inherent in the training aircraft itself. Thus the ASE may be modified to cause the training apparatus to assume a flight behavior that is peculiar to any desired size and type of helicopter.

All of the description to this point has related to a trainer for pilots of manned helicopters. It is also possible, however, to employ this invention as a trainer for drone helicopter pilots. In this embodiment of the invention the helicopter mounted on the ground cushion platform would have an automatic pilot and remote control radio receiver. The student drone helicopter pilot would then be stationed on the ground at some distance from the trainer and would control it remotely through a radio command link.

The features and advantages of the invention may be understood from the following detailed description together with the accompanying drawings.

In the drawings, which are to be regarded as merely illustrative:

FIG. 1 is a side elevation of a selected embodiment of the invention in the form of a helicopter trainer;

FIG. 2 is a reduced scale plan view of the base structure as seen along the line 2—2 of FIG. 1;

FIG. 3 is an enlarged fragmentary section taken as indicated by the line 3—3 of FIG. 2 and showing how the plenum chamber of the base structure may be provided with a yielding curtain on all sides;

FIG. 4 is a side elevation of one of the curtain members;

FIG. 5 is a side elevation of a second embodiment of the invention in which the power plant of the aircraft assembly creates the airflow for support of the base structure;

FIG. 6 is a fragmentary sectional view of a portion of the passage structure for delivering air to the base structure;

FIG. 7 is a fragmentary side elevational view illustrating the fact that the support structure may be in the form of a wheeled carriage;

FIG. 8 is a diagram of the portion of an automatic stabilization equipment that relates to the longitudinal pitching motions of the helicopter;

FIG. 9 is a diagram of the portion of an automatic stabilization equipment that relates to the lateral rolling motions of the helicopter;

FIG. 10 is a diagram of the portion of an automatic stabilization equipment that relates to the directional changes of the helicopter;

FIG. 11 is a fragmentary view similar to FIG. 3 showing how springs may be employed to urge the curtain members downward;

FIG. 12 is a plan view of a modified base structure showing how the base structure may form a plurality of plenum chambers for a desirable stabilizing action;

FIG. 13 is a section through the base structure taken as indicated by the line 13—13 of FIG. 12 and showing how the tipping of the base structure creates a correcting effect;

FIG. 14 is a side elevation of still another embodiment of the invention which employs a gimbal for connecting the aircraft assembly to the mobile base;

FIG. 15 is a fragmentary perspective view of the gimbal and associated structure;

FIG. 16 is a section of a pitch limiting arm of the associated structure taken along the line 16—16 of FIG. 15; and FIG. 17 is a section through the gimbal taken along the line 17—17 of FIG. 15.

*The aircraft*

FIG. 1 which illustrates a selected embodiment of the invention shows a helicopter trainer having a conventional fuselage which consists essentially of a framework carrying a pilot seat 10, an engine 12, and a fuel tank 15. The fuselage is provided with a landing support or support gear comprising two rear legs 16 and two forward skids 18. The trainer has the usual rotor assembly, generally designated 24, consisting of any number of blades 25 of airfoil cross section. The blades 25 are mounted to a hub of any conventional type with each blade being longitudinally pivoted to permit both cyclic and collective changes in pitch. The trainer also has the usual tail rotor blades 27 at the end of a rearwardly extending hollow beam 28 which beam encloses and conceals a drive shaft for the tail rotor blades and provides support for the control mechanism which is required for changing the pitch of the tail rotor blades.

A left hand control stick 30 controls the collective pitch of the main rotor blades 25 in the usual manner for varying the lift that is generated by the rotor assembly 24. A second control stick which is located between the pilot's knees is operated by the pilot's right hand and controls the cyclic pitch of the rotor assembly 24. A pair of rudder pedals 32 control the collective pitch of the tail rotor blades 27.

All of the helicopter structure described to this point is of conventional configuration using a main rotor with auxiliary anti-torque tail rotor. It should be pointed out, however, that the primary object of this invention, the use of a ground cushion platform to give the helicopter mobility while preventing it from tipping over, is equally applicable with any helicopter or other VTOL aircraft of different configuration or size than the one-man helicopter illustrated in FIG. 1. Other types of helicopters which might be employed, include, but are not limited to, coaxial rotor, tandem rotor, and lateral intermeshing rotor types. Each of these helicopters might have provisions for two or more pilots and any number of passengers or students. Also, although the helicopter shown in the figures has a pilot aboard, this invention has application to the training of drone helicopter pilots. In this case, the helicopter would carry only an automatic pilot and radio control receiver. The student drone helicopter pilot would be stationed on the ground at a point remote from the helicopter trainer and would control the trainer through a radio command link.

The mobile base

As shown in FIG. 1 the aircraft or flight vehicle is mounted on a mobile base or base structure, generally designated 34 which includes an upright means or support, generally designated 35. In this particular embodiment of the invention, the mobile base structure 34 is an air-cushion vehicle which forms a plenum chamber 36 (FIG. 3) that is open at the bottom. As explained in the introduction, however, this air-cushion vehicle may be of any type including but not limited to plenum chamber, momentum curtain, annular jet, and labyrinth. The base 34 may also be of any convenient geometric planform although for illustration FIG. 2 shows a rectangular configuration in plan with a top wall 38 and four side walls 40.

Preferably the air-cushion plenum chamber 36 is surrounded by a flexible curtain and for this purpose each of the four side walls 40 is of the hollow configuration shown in FIG. 3 to slidingly confine a corresponding curtain member in the form of a bar 42 which carries downwardly extending brushlike bristles or other suitably flexible material 44. Each of the four bars 42 is provided with spaced vertical slots 45 as indicated in FIG. 4 and each of the hollow side walls is provided with corresponding bolts 46 which extend through the slots. This brush-type curtain is effective to retard the escape of air from the plenum chamber and serves to increase the spacing of the base structure from the ground surface. Each of the four curtain members readily yields to obstacles and may be retracted into the corresponding hollow wall by an obstacle. If desired the curtain members may be flexible members such as bands or skirts made of plastic or elastomeric materials.

The air-cushioned platform only has to lift its own weight since the weight of the helicopter is carried by the helicopter's lifting rotor. Therefore, for a platform of practical dimensions the relative positive air pressure required in the plenum chamber is only approximately $\frac{1}{100}$ of a pound per square inch above the ambient atmospheric pressure. Power is needed by the ground cushion platform only to replace the air that escapes from the plenum chamber. Because of the small relative pressure in the plenum chamber, less than five horsepower are required to continuously replenish the plenum chamber. Suitable means for suplying air to the plenum chamber include but are not limited to the following:

(1) As shown in FIG. 1 the top wall 38 of the base structure may have one or more circular openings 48 each of which is surrounded by a cylindrical shroud 50. Mounted inside each of the cylindrical shrouds 50 is a fan 52 of any conventional type driven by power means 54. Each of said power means 54 may be an internal combustion reciprocating engine, a hydraulic motor, a gas turbine, or an electric motor. Current for said electric motor may be supplied either from a remote fixed source through a trailing cable or preferably it may be provided by a generator (not shown) which is driven by the engine 12 of the heilcopter.

(2) The second embodiment of the invention shown in FIGS. 5 and 6 is largely identical with the first embodiment as indicated by the use of corresponding numerals to indicate corresponding parts. The only difference is that the replenishing air for the plenum chamber that is formed by the base structure 34a is supplied by a compressor 70 that is mounted on the aircraft engine 12 and is driven by the aircraft engine. The compressor 70 is connected by a flexible hose 72 with a nipple 74 that is welded onto the tubular column 60a. The airstream provided by the compressor 70 enters the tubular column 60a from the nipple 74 and passes down through the tubular column and the pedestal 58a to the plenum chamber in the base structure. The joint between the nipple 74 and the tubular column 60a may be reinforced in the manner indicated in FIG. 6. A hollow structure 75 encloses the joint and is welded to the tubular column 60a not only for the purpose of strengthening the joint but also for the purpose of reinforcing the tubular column in the region where the tubular column is cut away to form the joint. The sliding joint between the tubular column 60a and the pedestal 58a is sealed by a packing ring 76 that is secured under pressure by a gland 77.

(3) The third embodiment of the invention is largely identical with the second embodiment except that the exhaust gases from the engine 12 of the aircraft assembly are collected by the engine exhaust manifold (not shown) and introduced into the flexible tube 72.

An advantage of the air-supported base of the first embodiment is that it is inherently stable because if it tends to tilt in any given direction, it widens the gap under the base to release air on one side of the base and narrows the gap to restrict air on the other side of the base. Thus tilting of the base results in reducing the support pressure on one side and increasing the support pressure on the other side to provide automatic correction for the tilt. The base is so stable that it will permit a reasonable amount of travel of the center of gravity. The base 34 may be provided with diagonal outriggers 55 at its corners, as shown in FIGS. 1 and 2, to serve as safeguards to prevent the base from scraping the surface over which it floats. Alternatively the base may be made large enough in area to make the outriggers unnecessary. Preferably each of the outriggers is provided with a castering wheel 56.

When air flow to the plenum chamber is stopped, the base 34 rests on the ground in an immobilized manner with the curtain members 42 retracted. It may be desirable, however, to move the base structure from one location to another when the airflow is cut off. For this purpose, the base 34 may be provided with four casters 78 mounted on manually operable screws 79. Normally the casters are retracted so that when air flow stops the base is immobilized by resting on the ground. Whenever desired the screws 79 may be turned to advance the casters 78 to transfer the weight of the base to the casters.

FIG. 7 indicates how a wheeled base 34b may be substituted for the air-supported base 34 of FIG. 1. The base 34b comprises a carriage of any convenient geometric planform mounted on casters 80. The carriage is provided with diagonally positioned outriggers 81 having casters 82, the outriggers constituting a safeguard to ensure that the base 34b will not be tipped over by the aerodynamic forces developed by the aircraft. At least one screw 83 equipped with a foot pad 84 may be provided to immobilze the base 34b when desired. The foot pad 84 is normally retracted above ground level but may be advanced into frictional engagement with the ground.

Mount of aircraft on mobile base

The aircraft is pivotally connected to the mobile base to allow the aircraft to tilt laterally in all directions relative to the mobile base. The mounting structure also has freedom for a limited range of vertical movement and full 360° directional movement relative to the mobile base to permit unrestricted airborne flight of the aircraft within that range.

The upright connecting means or support 35 includes a hollow pedestal 58 that is rigidly mounted on the top wall 38 of the base structure. Slidingly and rotatably mounted in the hollow pedestal 58 is a tubular column 60. The upper portion of the tubular column 60 is C-shaped with a lower portion 62 extending radially away from the vertical axis of the pedestal, an intermediate portion 64 extending upward and an upper end portion 65 that returns to the axis of the pedestal. The aircraft is connected to the upper end of the tubular column by a ball joint 66. Thus in effect, the base structure is pivotally connected to the aircraft assembly at a point on the aircraft assembly that is the center of the ball joint, this point being at approximately the center of gravity of the loaded aircraft when the pilot is seated aboard. The center of the ball joint is also approximately on the axis of rotation of the tubular column in the pedestal 58.

The purpose of offsetting the upper portion of the tubular column 60 to provide the C-shaped configuration is to keep the tubular column from interfering with the freedom of the aircraft to tilt longitudinally and laterally about the center of the ball joint 66. With the ball joint permitting tilt of the aircraft in any lateral direction and with the tubular column 60 roatably mounted in the pedestal 58, the upright connecting means 35 incorporates the equivalent of a universal joint that permits the aircraft to rotate relative to the base structure through the full azimuth and to assume any desired attitude. The freedom for the tubular column 60 to slide up and down inside the pedestal 58 approximately 20 inches provides a vertically restricted range of levels within which the aircraft may be airborne. The aircraft therefore has the freedom of motion that characterizes a freely airborne helicopter and is just as responsive to the flight controls as if it were freely airborne.

The manner in which the described embodiment of the invention serves its purpose may be readily understood from the foregoing description. The aircraft responds to the flight controls in the same manner as a conventional free flying helicopter. The student pilot may practice hovering within the 20 inch range of levels permitted by the upright connecting means 35 and since the base 34 is highly responsive to horizontal components of aerodynamic force created by the aircraft, the base will readily travel in any direction to give the student pilot practice in translational airborne flight within the 20 inch range of levels. The pilot cannot get into serious trouble by tilting the aircraft because the base 34 is too stable to be tipped over by the aircraft.

It has been found useful to provide suitable indicating means to inform the student pilot when the aircraft reaches its maximum and minimum levels within the 20 inch range of levels. For this purpose an upper indicator lamp 130 to indicate when the maximum level is reached and a lower indicator lamp 131 to indicate the minimum level may be placed on the panel board of the aircraft as indicated in FIG. 1. A corresponding pair of limit switches 132 and 133 may be incorporated in the pedestal 58 for operation by the tubular column 60. When the tubular column 60 approaches its lower limit position relative to the pedestal 58 it closes the switch 133 to energize the indicating lamp 131 and when it approaches its upper limit position it closes the switch 132 to energize the lamp 130.

A feature of the invention that is apparent in FIG. 1 is that the mobile base structure extends laterally sufficiently to intercept the tilting of the aircraft assembly. Thus, if the aircraft assembly tilts to the maximum in any direction, the angle of the tilt will be physically limited, and the aircraft assembly will be prevented from tilting into contact with the ground. In effect the mobile base is a traveling landing platform for the aircraft assembly which the landing gear may touch without relative ground movement. Thus the invention keeps the aircraft assembly from making hazardous contact with the ground when the aircraft assembly is traveling at relatively high speed.

If desired, means may also be provided for separately locking the vertical motion and rotational motion of the sliding vertical column 60 or 60a relative to the pedestal 58 or 58a. This will make it possible for the student pilot to learn to use one flight control at a time. For example, if vertical motion is locked and rotational motion is free the pilot can practice operating directional control only, then if rotational motion is locked and vertical motion is free the pilot can practice operating vertical lift (collective pitch) control only. Then both motions may be left free and the pilot can practice coordinating vertical and directional control simultaneously.

An illustrative method of separately locking vertical motion and directional motion is shown in FIGS. 5 and 6. The pedestal 58a has a vertical slot 85 on each side and the vertically sliding member 60a has a horizontal hole drilled through its center with diameters approximately equal to the width of the slot 85. Then when this hole is aligned with the slot 85 and a pin 86 is inserted through both members 58a and 60a, the slideable member 60a can rise vertically relative to the pedestal 58a but it is restrained by the pin 86 from rotating relative to the pedestal 58a. This allows the aircraft to rise relative to the base but restrains the aircraft from rotating about the vertical axis relative to the base.

To restrain vertical motion of the sliding member 60a while allowing it to rotate freely relative to the pedestal 58a, the pedestal 58a may be fitted with a removable collar 88 as shown in FIG. 6, a small space being provided between the inside horizontal surface of this collar and the top horizontal surface of the pedestal 58a as shown in FIG. 6. If desired the collar 88 may be made in two halves for ease of attachment to the pedestal 58a. A horizontal hole is drilled through the center of the sliding member 60a, the diameter of this hole being approximately equal to the vertical distance between the inside horizontal surface of the collar 88 and the top horizontal surface of the pedestal 58a. A pin 90 is then inserted through the hole in the sliding member 60a. The length of this pin is approximately equal to the inside diameter of the collar 88. With the pin 90 and the collar 88 in place, the member 60a can rotate freely relative to the pedestal 58a but is restrained from sliding vertically relative to the pedestal 58a.

*Variable stability system*

It is contemplated that the aircraft may be provided with an electro-mechanical variable stability system. During training, this system may be utilized to provide either of the following two desirable effects:

(a) The variable stability system can provide artificial stabilization to any degree desired with the balance of stabilization being provided by the student pilot. Thus the student can start training in a highly stabilized helicopter, then as he gains experience the effect of the artificial stabilization can be progressively decreased until the student is supplying the total stabilization required by the aircraft.

(b) A second function of the variable stability system is to make the flight trainer simulate the flying qualities of other types of helicopters. This will make it possible to start training the student in the artificially stabilized flight trainer and then progressively change its flight handling characteristics to simulate those he will encounter in the helicopter to be flown during the next phase of his training.

The means by which these characteristics are achieved for the longitudinal motions and longitudinal control of the aircraft may be understood from reference to FIG. 8. The cyclic control stick 92 which is located between the pilot's knees may be moved fore and aft by the pilot. This motion is carried through push-pull tubes 94, 95 and the mixing linkage 96 to produce longitudinal tilt of the swashplate as shown schematically in FIG. 8. If the automatic stabilization equipment is turned off, the pivot point 93 remains fixed to the airframe and all the motion of the cyclic control stick 92 is transmitted through the lever system to the swashplate.

For longitudinal control, the artificial stabilization system operates in the following manner. Four sensors are employed as shown in FIG. 8 to sense:

(a) Longitudinal control stick force
(b) Longitudinal aircraft attitude in space
(c) Longitudinal aircraft pitching rate
(d) Longitudinal translational airspeed of the aircraft.

These sensors are know to those skilled in the art of automatic flight control. The electrical output signals from these sensors are passed through electrical gain control units $K_1$, $K_2$, $K_3$, $K_4$ and electrically mixed together at point 100. These signals are then amplified as required and used to drive the electro-mechanical actuator 102. The force from this actuator is transmitted through the push-pull rods 104, 95 and the mixing linkage 96 to produce longitudinal tilt of the swashplate as shown schematically in FIG. 8.

The effects of the gain controls $K_1$, $K_2$, $K_3$, $K_4$ will now be described.

$K_1$ varies manual control sensitivity:

$K_1<0$; electronic system shifts point 98 in the appropriate direction to diminish manual control sensitivity
$K_1=0$; electronic system has no effect on manual control sensitivity
$K_1>0$; electronic system shifts point 98 in the appropriate direction to magnify manual control sensitivity.

$K_2$ varies static attitude stability and natural frequency:

$K_2<0$; electronic system maneuvers point 98 to diminish the static stability and natural frequency of the aircraft
$K_2=0$; electronic system has no effect on the static stability and natural frequency of the aircraft
$K_2>0$; electronic system maneuvers point 98 to increase the static stability and natural frequency of the aircraft.

$K_3$ varies dynamic attitude stability and damping:

$K_3<0$; electronic system maneuvers point 98 to diminish the dynamic stability and damping of the aircraft
$K_3=0$; electronic system has no effect on dynamic stability and damping of the aircraft
$K_3>0$; electronic system maneuvers point 98 to increase the dynamic stability and damping of the aircraft.

$K_4$ varies translational velocity stability:

$K_4<0$; electronic system maneuvers point 98 to diminish the translational velocity stability of the aircraft
$K_4=0$; electronic system has no effect on translational velocity stability of the aircraft
$K_4>0$; electronic system maneuvers point 98 to increase the translational velocity stability of the aircraft.

By setting the gain controls $K_1$, $K_2$, $K_3$ and $K_4$ in the proper combination the longitudinal dynamic characteristics of any helicopter can be simulated.

FIG. 9 shows a schematic of the lateral stabilization system which is essentially identical to the longitudinal system described above. Here again the cyclic control stick 92 controls lateral tilt of the swashplate by means of a push-pull rod 105, a mixing linkage 106 and a push-pull rod 108. If the automatic stabilization equipment is turned off, the pivot point 110 remains fixed relative to the air frame so that all of the lateral motion of the cyclic control stick 92 is transmitted to the swashplate. For lateral control, the automatic stabilization system employs a sensor to sense lateral control stick force, a sensor to sense lateral aircraft attitude in space, a sensor to sense the lateral pitching rate of the aircraft and a sensor to sense the lateral translational air speed of the aircraft. The electric output signals from these four sensors are passed through electrical gain control units $K_5$, $K_6$, $K_7$ and $K_8$ respectively, and are electrically mixed together at point 12. The signals are then amplified as required to drive an electro-mechanical actuator 114. The actuator 114 operates a push-pull rod 115 that is connected to the mixing linkage 106 at the point 110.

The effects of the gain controls $K_5$, $K_6$, $K_7$ and $K_8$ are similar to the previously described effects of gain controls $K_1$, $K_2$, $K_3$ and $K_4$.

$K_5$ varies manual control sensitivity:

$K_5<0$; electronic system shifts point 110 in the appropriate direction to diminish manual control sensitivity
$K_5=0$; electronic system has no effect on manual control sensitivity
$K_5>0$; electronic system shifts point 110 in the appropriate direction to magnify manual control sensitivity $K_6$ varies static attitude stability and natural frequency:

$K_6<0$; electronic system maneuvers point 110 to diminish the static stability and natural frequency of the aircraft
$K_6=0$; electronic system has no effect on the static stability and natural frequency of the aircraft
$K_6>0$; electronic system maneuvers point 110 to increase the static stability and natural frequency of the aircraft $K_7$ varies dynamic attitude stability and damping:

$K_7<0$; electronic system maneuvers point 110 to diminish the dynamic stability and damping of the aircraft
$K_7=0$; electronic system has no effect on dynamic stability and damping of the aircraft
$K_7>0$; electronic system maneuvers point 110 to increase the dynamic stability and damping of the aircraft $K_8$ varies translational velocity stability:

$K_8<0$; electronic system maneuvers point 110 to diminish the translational velocity stability of the aircraft
$K_8=0$; electronic system has no effect on translational velocity stability of the aircraft
$K_8>0$; electronic system maneuvers point 110 to increase the translational velocity stability of the aircraft FIG. 10 is a schematic of the directional artificial stabilization system. This system operates on the same principle as the systems previously described except that it is basically more simple requiring only two sensors to sense:

(a) Directional control (rudder pedals 32) force
(b) Directional aircraft turning rate As in the longitudinal and lateral artificial stabilization systems, these sensors are readily available commercial components which are well known to those skilled in the art of automatic flight control. The electrical output signals from these sensors are passed through electrical gain control units $K_9$ and $K_{10}$ and electrically mixed together at point 116. These signals are then amplified as required and used to drive the electro-mechanical actuator 118. The force from this actuator is transmitted through the push-pull rods 120, 122 and the mixing linkage 124 to produce change in the collective pitch of the antitorque rotor as shown schematically in FIG. 10.

If the artificial stabilization equipment is turned off, the pivot point 125 remains fixed relative to the air frame and all the motion of the cyclic control stick 92 is transmitted through the lever system to the anti-torque rotor. If the artificial stabilization equipment is turned on the force produced by the actuator 118 is transmitted to the anti-torque rotor through a push-pull rod 126, the previously mentioned push-pull rod 122 and the mixing linkage 124.

The effects of the gain controls $K_9$ and $K_{10}$ will now be described.

$K_9$ varies manual control sensitivity:

$K_9<0$; electronic system shifts point 125 to diminish manual control sensitivity
$K_9=0$; electronic system has no effect on manual control sensitivity
$K_9>0$; electronic system shifts point 125 to magnify manual control sensitivity $K_{10}$ varies dynamic directional stability and damping:

$K_{10}<0$; electronic system shifts point 125 to diminish the dynamic directional stability and damping of the aircraft $K_{10}=0$; electronic system has no effect on the dynamic directional stability and damping of the aircraft $K_{10}>0$; electronic system shifts point 125 to increase the dynamic directional stability and damping of the aircraft By setting the gain controls $K_9$ and $K_{10}$ in the proper combination the directional dynamic characteristics of any helicopter can be simulated.

My description in specific detail of the selected embodiments of the invention will suggest various changes, substitutions and other departures from my disclosure within the spirit and scope of the appended claims. For example, the previously described curtain members may be provided with springs as shown in FIG. 11 and the base structure may be of octagonal configuration and may be divided into several compartments or plenum chambers as shown in FIGS. 12 and 13.

In the modification of the invention shown in FIG. 11, the structure is largely identical with the structure shown in FIG. 3 as indicated by the use of corresponding numerals to indicate corresponding parts. The modification consists in the addition of a plurality of springs 135 to exert downward pressure on the bars 42a that carry the downwardly extending bristles 44a. The springs 135 are compression coil springs which seat in bores 136 in the bars 42a. The springs 135 are added to exert downward forces that make the curtains more efficient for their purpose.

The base structure, generally designated 34c in FIG. 12 is of octagonal configuration in plan being formed with an octagonal top wall 138 and a continuous side wall 140. The interior of the base structure 34c is divided by partitions 142 into eight separate plenum chambers 144a–144h. The top wall 138 is formed with eight inlet ports 145 for the eight plenum chambers respectively and suitable means (not shown) of the character heretofore described is provided to deliver compressed air at equal rates to the eight inlet ports.

The stabilizing effect of providing a plurality of independent plenum chambers in the base structure may be understood by reference to FIG. 13. In FIG. 13 the base structure 34c is tilted so that the left edge of the base structure is closer to the ground than the right edge. The effect of the tilt is to restrict the escape of air from the plenum chamber 144a under the left edge of the base structure with consequent rise in pressure in the plenum chamber. On the other hand, the effect of the tilt is to increase the gap between the ground and the right edge of the base structure to increase the freedom of discharge of air from the plenum chamber 144e with consequent lowering of pressure in the plenum chamber. Thus the rise in pressure in the left plenum chamber 144a and the simultaneous lowering of pressure in the right plenum chamber 144e creates correcting forces that tend to restore the base structure to its normal position parallel to the ground.

The last embodiment of the invention shown in FIGS. 14–17 is largely identical with the first embodiment shown in FIG. 1 as indicated by the use of corresponding reference numerals to indicate corresponding parts. The essential difference is that the ball joint 66 of FIG. 1 is replaced by a gimbal, generally designated 150. In addition certain limiting or stop structure may be associated with the gimbal as will be explained, to limit the degree to which the aircraft assembly may tilt in various directions relative to the mobile base.

In FIG. 14, the upper end portion 65b of the tubular column 60b has a short upright end 152 on which the gimbal 150 is mounted. As shown in FIGS. 15 and 17, the upright end 152 of the tubular column fixedly carries a transverse pivot bolt 154 in a fixed reinfocement sleeve 155 and a gimbal yoke 156 is journaled on the pivot bolt by a pair of ballbearings 158. The axis 160 of the pivot bolt 154 is the roll axis of the aircraft assembly, i.e. the axis extending longitudinally of the aircraft assembly about which the aircraft assembly may tilt from side to side. While this axis is fixed relative to the aircraft assembly longitudinally thereof, it is free to swing in a horizontal plane relative to the mobile base because, as heretofore noted, the tubular column 60b is rotatable as well as vertically slidable in the pedestal 58.

The fixed frame structure of the aircraft assembly includes two struts 162 on each of the two sides of the gimbal yoke 156 which converge at the gimbal yoke and are pivotally connected to the gimbal yoke by means of a transverse pivot bolt 164. In the construction shown, each of the pairs of convergent struts 162 is integral with a sleeve 165 that is journaled on the pivot bolt 164. The axis 166 of the pivot bolt 164 extends transversely of the aircraft perpendicular to the axis of the previously mentioned pivot bolt 154 and is the pitch axis since the aircraft assembly is free to tilt longitudinally fore and aft about the axis.

In the first embodiment of the invention shown in FIG. 1, the mobile base structure 34 serves as a landing platform for landing gear or support gear comprising the two rear legs 16 and the two forward skids 18 of the aircraft assembly. When the aircraft assembly is airborne, the mobile base structure cooperates with the landing gear to function as stop means to limit the degree to which the aircraft assembly may pitch and roll. It is apparent, however, that the angular limit permitted by the stop means varies with the height of the aircraft assembly from the mobile base structure. Thus the permitted angular range is maximum when the tubular column 60b is at maximum vertical extension relative to the pedestal 58.

In this regard, a feature of the embodiment of the invention shown in FIGS. 14–17 is that the means to limit the pitch and roll of the aircraft assembly is associated with the gimbal 150 and the limited range is constant at all elevations of the aircraft assembly relative to the mobile base. A further feature is that the pitch range and the roll range are independently adjustable.

For the purpose of limiting the freedom of angular movement of the aircraft assembly about the roll axis 160, a suitable stop bracket 168 is fixedly mounted on the gimbal yoke 156 by screws 169, the bracket having a pair of stop arms 170 to cooperate with a corresponding pair of stop elements 172 on the upright end 152 of the tubular column 60b. In the construction shown, each stop arm 170 carries a stop screw 174, the head 175 of which cooperates with a bumper 176 on the corresponding stop element 172. The two stop screws 174 may be adjusted to vary the range of roll of the aircraft assembly and any selected adjustment may be maintained by tightening a lock nut 178.

For the purpose of limiting the angular range of pitch of the aircraft relative to the mobile base, a stop link 180 is pivotally connected to the fixed structure of the aircraft assembly by suitable pivot means 182, and this stop link is slidable in a stop sleeve 184 on the end of a stop arm 185 that is rigidly fixed to the gimbal yoke 156. In the construction shown, a tube 186 extend rigidly from the gimbal yoke 156 and the stop arm 185 is rigidly secured to the tube by suitable bolts 188. The outer end of the stop arm 185 is forked to straddle the stop sleeve 184 and the stop sleeve is pivotally mounted on the forked end by trunnions 190 to conform to the changes of angle of the stop link.

A pair of stop collars 192 and 194 are mounted on the link 180 on opposite sides of the stop sleeve 184 to cooperate therewith to limit oscillation of the aircraft about the pitch axis. Thus when the forward end of the aircraft assembly dips excessively, the stop collar 192 makes abutment with the stop sleeve 184 and when the forward end rises excessively, the stop collar 194 abuts the sleeve.

The two stop collars 192 and 194 are adjustable with respect to their spacing to vary the limits of rotation of the aircraft about the pitch axis. For this purpose, the stop link 180 is provided with a series of diametrical bores 195 and each of the two stop collars is releasably anchored by a transverse screw 196 which is adopted to engage the bores 195 selectively.

It is apparent that if there is any hazardous tendency for the aircraft assembly to tip completely over either about its roll axis or about its pitch axis, the tipping movement will be arrested by the stop structure associated with the gimbal 150. The tubular column 60b is of adequate strength to withstand the maximum impact that may occur in this manner and the mobile base of the aircraft assembly is stable to withstand the reaction to such impact forces without any hazardous tendency to tip over.

An important advantage of the adjustability of the stop arrangement is that the ranges of motion about the roll and the pitch axis may be reduced to any desired degree to facilitate flying instruction. Thus both ranges may be temporarily reduced to zero to limit the freedom of the maneuver to changes in azimuth. Later freedom for motion about the pitch axis only may be restored to permit the student pilot to concentrate on pitch control or freedom for movement about the roll axis only may be restored to permit the student pilot to concentrate on roll control.

I claim:

1. In a trainer of the character described, the combination of:
    a flight vehicle having flight controls and flight power;
    a base structure including an upwardly extending support, said support being upwardly extensible and downwardly contractable along a given upright path;
    means connecting the flight vehicle to the support for up and down movement along said path, said connecting means being pivotal to permit freedom for tilt of the flight vehicle over a given range relative to the base structure; and
    means adjacent said connecting means and adjacent the upper portion of said support to serve as stop means at the end of said range to limit the tilt of the flight vehicle to keep the flight vehicle from turning over and to keep the flight vehicle from touching the ground,
    said base structure being freely movable along ground in response to flight forces generated by the flight vehicle and being of substantial horizontal extent for high stability to withstand tilting moments on the base structure created by the flight forces and created by said stop means when the flight vehicle tilts to its limit.

2. In a trainer of the character described, the combination of:
    a flight vehicle having flight controls and flight power;
    a base structure mounted on ground wheels for free movement along the ground in response to flight forces generated by the flight vehicle;
    a support mounted on said base structure and extending upwardly therefrom, said support being upwardly extensible and downwardly contractable along a given upright path centrally of the base structure;
    means connecting the flight vehicle to the support for up and down movement along said path, said connecting means being pivotal to permit tilt of the flight vehicle relative to the base structure,
    said base structure being of substantial horizontal extent for high stability to withstand tilt moments on the base structure created by the flight forces,
    said base structure being of sufficient horizontal extent to serve as a landing platform for the flight vehicle, and
    said base structure being of sufficient horizontal extent to keep the flight vehicle from tilting into contact with the ground when the flight vehicle is at a maximum elevation along said path.

3. In a trainer of the character described, the combination of:
    a flight vehicle having flight controls and flight power;
    said flight vehicle having landing gear;
    a base structure including an upwardly extending support;
    means connecting the flight vehicle to the support, said connecting means being pivotal to permit tilt of the flight vehicle relative to the base structure,
    said base structure being of substantial horizontal extent for high stability to withstand tilting moments on the base structure created by the flight forces,
    said base structure being of sufficient horizontal extent to serve as a landing platform for the flight vehicle whereby the flight vehicle rests on the base structure when not in flight,
    said base structure being upwardly extensible and downwardly contractable along a given upright path centrally of the base structure to permit the flight vehicle to rise a given distance above the base structure when the flight vehicle is in flight, the upward extent of said path, the horizontal extent of said landing gear and the horizontal extent of the platform being such that when the aircraft is at its maximum elevation on said path the landing gear cooperates with the base structure to keep the aircraft from turning over and to keep the aircraft from tilting into contact with the ground.

4. In a trainer of the character described, the combination of:
    a flight vehicle having flight controls and flight power;
    a base structure including an upwardly extending support, said support being upwardly extensible and downwardly contractable along a given upright path;
    a gimbal connecting the flight vehicle to the support for up and down movement along said path, said gimbal having a first pivot axis longitudinally of the flight vehicle to serve as the roll axis for the flight vehicle and having a second pivot axis transverse to the flight vehicle to serve as the pitch axis of the flight vehicle; and
    two cooperating means on the flight vehicle and the gimbal respectively to serve as means to restrict the tilt of the flight vehicle about one of said axes, said restricting means being adjustable to restrict the tilt to various degrees,
    said base structure being freely movable along the ground in response to flight forces generated by the flight vehicle and being of substantial horizontal extent for high stability to withstand tilting moments on the base structure created by the flight forces.

5. In a trainer of the character described, the combination of:
    a flight vehicle having flight controls and flight power;
    a base structure including an upwardly extending support, said support being upwardly extensible and downwardly contractable along a given upright path;
    a gimbal connecting the flight vehicle to the support for up and down movement along said path, said gimbal having a first pivot axis longitudinally of the flight vehicle to serve as the roll axis for the flight vehicle and having a second pivot axis transverse to the flight vehicle to serve as the pitch axis of the flight vehicle;
    a sleeve pivotally mounted on one of said flight vehicle and said gimbal;
    a link pivotally connected to the other of said flight vehicle and said gimbal, said link being slidingly embraced by said sleeve; and
    stop collars on said link on opposite sides of the sleeve, said stop collars being adjustable along the link to restrict to various degrees the tilt of the flight vehicle about one of said axes, said base structure being freely movable along the ground in response to flight forces generated by the flight vehicle and being of substantial horizontal extent for high stability to withstand tilting moments on the base structure created by the flight forces.

6. A combination as set forth in claim 5 in which said stop collars are adjustable with respect to their spacing from each other.

7. In a trainer of the character described, the combination of:
   a flight vehicle having flight controls and flight power;
   a base structure including an upwardly extending support, said support being upwardly extensible and downwardly contractable along a given upright path;
   a gimbal connecting the flight vehicle to the support for up and down movement along said path, said gimbal having a first pivot axis longitudinally of the flight vehicle to serve as the roll axis for the flight vehicle and having a second pivot axis transverse to the flight vehicle to serve as the pitch axis of the flight vehicle; and
   two cooperating means on the gimbal and the upwardly extending support means respectively to function as means to limit the tilt of the flight vehicle about one of said axis, said limiting means being adjustable to restrict the tilt to various degrees,
   said base structure being freely movable along the ground in response to flight forces generated by the flight vehicle and being of substantial horizontal extent for high stability to withstand tilting moments on the base structure created by the flight forces.

References Cited by the Examiner
UNITED STATES PATENTS

| | | | |
|---|---|---|---|
| 1,909,573 | 5/1933 | Custer | 272—1 |
| 2,954,614 | 10/1960 | Vogt | 35—12 |
| 3,067,528 | 12/1962 | Agusta | 35—12 |
| 3,131,486 | 5/1964 | Derschmidt | 35—12 |
| 3,137,500 | 6/1964 | Stensager | 35—12 X |
| 3,164,911 | 1/1965 | Vaughen | 35—12 |

EUGENE R. CAPOZIO, *Primary Examiner.*

LAWRENCE CHARLES, *Examiner.*